United States Patent
Gorman et al.

(10) Patent No.: US 8,710,155 B2
(45) Date of Patent: Apr. 29, 2014

(54) PROCESS FOR BROMINATING UNSATURATED ORGANIC COMPOUNDS WITH REMOVAL OF QUATERNARY AMMONIUM OR QUATERNARY PHOSPHONIUM MONOCHLORIDES

(75) Inventors: David B. Gorman, Midland, MI (US); Douglas C. Greminger, Midland, MI (US); Ronald B. Leng, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 173 days.

(21) Appl. No.: 13/257,999

(22) PCT Filed: Feb. 2, 2010

(86) PCT No.: PCT/US2010/022802
§ 371 (c)(1),
(2), (4) Date: Sep. 21, 2011

(87) PCT Pub. No.: WO2010/114637
PCT Pub. Date: Oct. 7, 2010

(65) Prior Publication Data
US 2012/0016088 A1    Jan. 19, 2012

Related U.S. Application Data

(60) Provisional application No. 61/165,402, filed on Mar. 31, 2009.

(51) Int. Cl.
*C08F 12/08* (2006.01)
*C08F 8/18* (2006.01)

(52) U.S. Cl.
USPC ............ 525/333.3; 525/333.4; 525/359.5

(58) Field of Classification Search
USPC ................ 525/359.5, 359.1, 333.3–333.4
See application file for complete search history.

(56) References Cited

U.S. PATENT DOCUMENTS

| 2008/0064774 | A1 | 3/2008 | Stobby |
| 2008/0287559 | A1 | 11/2008 | King et al. |
| 2009/0008236 | A1 | 1/2009 | Leng |
| 2009/0292079 | A1 | 11/2009 | Murray et al. |
| 2010/0004402 | A1* | 1/2010 | King et al. ............ 525/359.5 |
| 2010/0317757 | A1 | 12/2010 | King |
| 2011/0136984 | A1 | 6/2011 | Hull |

FOREIGN PATENT DOCUMENTS

| WO | 2007058736 A | 5/2007 |
| WO | 2008021417 A | 2/2008 |
| WO | 2008021418 A | 2/2008 |
| WO | 2009006036 A | 1/2009 |
| WO | 2009108453 A | 9/2009 |
| WO | 2010021906 A | 2/2010 |

* cited by examiner

*Primary Examiner* — Monique Peets
(74) *Attorney, Agent, or Firm* — Gary C Cohn PLLC

(57) ABSTRACT

Unsaturated organic compounds are brominated with a quaternary ammonium tribromide or a quaternary phosphonium tribromide, especially when the bromination is conducted in a chlorinated solvent. A quaternary ammonium or quaternary phosphonium monobromide salt is produced in the reaction, together with some amount of quaternary ammonium or quaternary phosphonium monochloride salt. The monochloride salt is converted to the corresponding quaternary ammonium monobromide salt by reacting it with a source of bromide ions. The monobromide salt is then reacted with bromine to regenerate the quaternary ammonium or phosphonium tribromide, which is recycled into the bromination reaction. This process reduces the amount of chlorine that is incorporated into the brominated product.

10 Claims, 1 Drawing Sheet

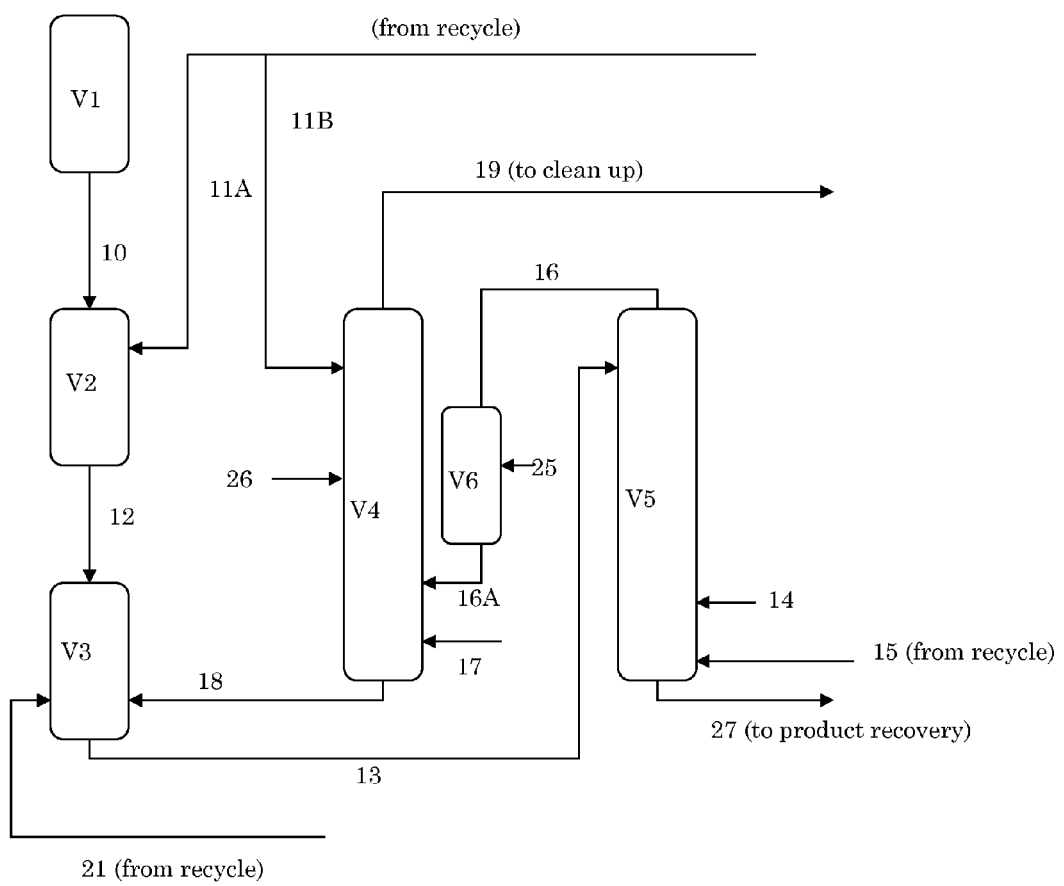

PROCESS FOR BROMINATING UNSATURATED ORGANIC COMPOUNDS WITH REMOVAL OF QUATERNARY AMMONIUM OR QUATERNARY PHOSPHONIUM MONOCHLORIDES

This application claims priority from U.S. Provisional Application No. 61/165,402, filed 31 Mar. 2009.

The present invention relates to a process for brominating compounds having aliphatic carbon-carbon double bonds, such as a butadiene homopolymer or copolymer. Examples of butadiene copolymer include block, random or graft copolymers of styrene and butadiene.

WO 2008/021417 describes a process for brominating a butadiene copolymer. The brominating agent is a phenyltrialkylammonium tribromide, benzyltrialkylammonium tribromide or tetraalkylammonium tribromide. The process is conducted with the copolymer in solution. A highly selective bromination of aliphatic carbon-carbon double bonds is achieved, leaving the aromatic rings essentially unaffected. The process is preferably run in a chlorinated solvent that does not contain oxygen. This helps to minimize the formation of ether groups on the polymer, which is beneficial because the ether groups often adversely affect the thermal stability of the brominated polymer. Surprisingly little halogen exchange occurs between the brominated polymer and the chlorinated solvent, if temperature conditions are controlled to below about 80° C. Nonetheless, this reaction is not entirely suppressed.

A similar process, that substitutes certain quaternary phosphonium tribromides for the quaternary ammonium tribromides, is described in PCT Application No. PCT/US09/53699, filed 13 Aug. 2009.

A potential use for the brominated polymer is as a flame retardant additive for thermoplastic polymers such as polystyrene. The thermal characteristics of the brominated polymer are very important in that application. The thermoplastic polymer is typically blended with the brominated polymer in a melt blending process. The blend is in most cases simultaneously or subsequently melt processed to form a fabricated product. The brominated polymer must be heat-stable at the temperatures encountered during the melt blending and melt processing operations. In addition, the brominated polymer must be able to decompose under fire conditions to liberate bromine or hydrogen bromide. If the brominated polymer is too heat-stable, it does not decompose at the correct temperature and is ineffective as a flame retardant. It has been found that a brominated polybutadiene copolymer can have the thermal characteristics which are needed for the flame retardant applications, if it is prepared carefully by minimizing certain side reactions. The process described in WO 2008/021417 produces a brominated polybutadiene copolymer having desirable thermal characteristics.

Some halogen exchange reactions can occur when a halogenated solvent in used in the foregoing processes. The extent of this reaction is often small, but there is a continuing desire to suppress these reactions as much as possible in order to maximize thermal stability, maximize the efficiency of the product as an FR agent, and promote product consistency.

A problem with the bromination process described in WO 2008/021417 is that the reaction proceeds slowly under reaction conditions that are otherwise advantageous. Bromination tends to be rapid at early stages of conversion, but long reaction times are needed when high conversion of the butadiene units is required. In U.S. Provisional Application No. 61/090,954, a reduction in reaction time is achieved by adding water or certain solvents to the bromination reaction after the reaction has become from 25 to 90% completed. This approach allows reaction times to be decreased very substantially, with a small penalty in the purity of the brominated product.

An analogous situation can occur when other unsaturated organic compounds are brominated with a quaternary ammonium or phosphonium tribromide, especially if the bromination is performed in a chlorinated solvent.

Therefore, it is desired to provide a process for brominating an organic compound having aliphatic carbon-carbon double bonds, in which the chlorine content of the resulting brominated compound is kept at a very low level. It is desirable to achieve this even in cases in which the bromination reaction is preformed in a chlorinated solvent, as chlorinated solvents sometimes provide certain advantages in the bromination reaction, compared to many other solvents. It is especially desirable to achieve these advantages while still maintaining reasonably short reaction times.

This invention is a process for producing a brominated organic compound, comprising a) contacting an unsaturated compound containing aliphatic carbon-carbon double bonds with a quaternary amm (phosph)onium tribromide in the presence of at least one solvent for the butadiene polymer under conditions such that the unsaturated compound becomes brominated and, as a by-product, a mixture of a quaternary amm(phosph)onium monobromide salt and a quaternary amm(phosph)onium monochloride salt is formed, b) contacting said quaternary amm(phosph)onium monochloride salt by-product with a source of bromide ions under conditions that at least a portion of the quaternary amm(phosph)onium monobromide salt reacts with said source of bromide ions to regenerate a quaternary amm(phosph)onium monobromide salt or quaternary ammonium phosphonium monobromide salt and a chloride by-product;

c) contacting the regenerated quaternary amm(phosph)onium monobromide salt with bromine to form the corresponding quaternary amm(phosph)onium tribromide; and then d) before, during or after step c), separating the chloride by-product from the regenerated quaternary amm(phosph) onium monobromide salt or quaternary amm(phosph)onium tribromide and then e) recycling quaternary ammonium tribromide or quaternary phosphonium tribromide obtained in step c) back into step a).

As used herein, the designation "amm(phosph)onium" is used as a shorthand term which includes both ammonium and phosphonium. Thus, for example, the term "quaternary amm (phosph)onium monobromide salt" includes quaternary ammonium monobromide salts and quaternary phosphonium monobromide salts, and the term "quaternary amm(phosph) onium tribromide" includes quaternary ammonium tribromides and quaternary phosphonium tribromides.

Also, for purposes of this invention, the starting unsaturated organic compound is considered to become brominated when two atoms of bromine add across at least one aliphatic carbon-carbon double bond of the unsaturated organic compound such that each of the carbon atoms becomes bonded to a bromine atom. Hydrobromination, that is the addition of HBr across an aliphatic carbon-carbon double bond, is considered for purposes of this invention to be an unwanted side-reaction that in most cases is to be minimized or avoided.

Applicants have found that that quaternary amm(phosph) onium monochloride species tend to form during the bromination reaction, and that the presence of these species, if allowed to remain in the system, apparently promote the incorporation of chlorine atoms into the brominated polymer.

This invention removes the quaternary amm(phosph)onium monochloride species and in that manner can reduce the incidence of chlorine in the brominated product.

The FIGURE is a schematic diagram of an embodiment of a process according to the invention The starting material to be brominated can be any organic compound that contains at least one aliphatic carbon-carbon double bond. In the broadest aspect of the invention, the molecular weight of the starting material is insignificant. Therefore, the starting material may be, for example, a simple mono-olefin such as ethylene, propylene or other alpha-olefin, a cycloaliphatic mono- or polyolefin, or an organic polymer that contains aliphatic carbon-carbon unsaturation. In broad aspects of the invention, the starting material may contain a wide variety of substituent groups.

However, polymers of butadiene are the starting materials of most interest in this process, because of their potential utility as flame retardants. The butadiene polymer may be a homopolymer, or a copolymer of butadiene and one or more other monomers. A copolymer may be a random, block or graft copolymer, and should contain at least 10% by weight of polymerized polybutadiene. Butadiene polymerizes to form two types of repeating units. One type, referred to herein as "1,2-butadiene units" takes the form

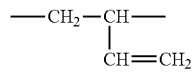

and so introduce pendant unsaturated groups to the polymer. The second type, referred to herein as "1,4-butadiene" units, takes the form —CH$_2$—CH═CH—CH$_2$—, introducing unsaturation into the main polymer chain. The butadiene polymer should contain at least some 1,2-butadiene units. Of the butadiene units in the butadiene polymer, suitably at least 10%, preferably at least 15% and more preferably at least 20% and even more preferably at least 25% are 1,2-butadiene units. 1,2-butadiene units may constitute at least 50%, at least 55%, at least 60% or at least 70% of the butadiene units in the butadiene polymer. The proportion of 1,2-butadiene units may be in excess of 85% or even in excess of 90% of the butadiene units in the polymer.

Methods for preparing butadiene polymers with controlled 1,2-butadiene content are described by J. F. Henderson and M. Szwarc in *Journal of Polymer Science* (D, Macromolecular Review), Volume 3, page 317 (1968), Y. Tanaka, Y. Takeuchi, M. Kobayashi and H. Tadokoro in *J. Polym. Sci.* A-2, 9, 43-57 (1971), J. Zymona, E. Santte and H. Harwood in *Macromolecules*, 6, 129-133 (1973), and H. Ashitaka, et al., in *J. Polym. Sci., Polym. Chem.*, 21, 1853-1860 (1983).

A more preferred starting material is a random, block or graft copolymer of butadiene and at least one vinyl aromatic monomer. A "vinyl aromatic" monomer is an aromatic compound having a polymerizable ethylenically unsaturated group bonded directly to a carbon atom of an aromatic ring. Vinyl aromatic monomers include unsubstituted materials such as styrene and vinyl naphthalene, as well as compounds that are substituted on the ethylenically unsaturated group (such as alpha-methylstyrene, for example), and/or are ring-substituted. Ring-substituted vinyl aromatic monomers include those having halogen, alkoxyl, nitro or unsubstituted or substituted alkyl groups bonded directly to a carbon atom of an aromatic ring. Examples of such ring-substituted vinyl aromatic monomers include 2- or 4-bromostyrene, 2- or 4-chlorostyrene, 2- or 4-methoxystyrene, 2- or 4-nitrostyrene, 2- or 4-methylstyrene and 2,4-dimethylstyrene. Preferred vinyl aromatic monomers are styrene, alpha-methyl styrene, para-methyl styrene, and mixtures thereof.

"Vinyl aromatic units" are repeating units in the starting material that are formed when a vinyl aromatic monomer is polymerized. A suitable butadiene/vinyl aromatic starting copolymer contains from 5 to 90 percent by weight of polymerized vinyl aromatic monomer units and at least 10% by weight of polymerized butadiene.

A butadiene/vinyl aromatic copolymer may be a random, block (including multiblock such as diblock or triblock types) or graft type of copolymer. Styrene/butadiene block copolymers are widely available in commercial quantities. Those available from Dexco Polymers under the trade designation VECTOR™ are suitable. Styrene/butadiene random copolymers may be prepared in accordance with the processes described by A. F. Halasa in *Polymer*, Volume 46, page 4166 (2005). Styrene/butadiene graft copolymers may be prepared in accordance with methods described by A. F. Halasa in *Journal of Polymer Science* (Polymer Chemistry Edition), Volume 14, page 497 (1976). Styrene/butadiene random and graft copolymers may also be prepared in accordance with methods described by Hsieh and Quirk in chapter 9 of *Anionic Polymerization Principles and Practical Applications*, Marcel Dekker, Inc., New York, 1996.

A starting butadiene polymer may also contain repeating units formed by polymerizing monomers other than butadiene and a vinyl aromatic monomer. Such other monomers include olefins such as ethylene and propylene, acrylate or acrylic monomers such as methyl methacrylate, methyl acrylate, acrylic acid, and the like. These monomers may be randomly polymerized with the butadiene, may be polymerized to form blocks, or may be grafted onto the butadiene polymer.

The most preferred type of butadiene polymer is a block copolymer containing one or more polystyrene blocks and one or more polybutadiene blocks. Among these, diblock copolymers, and triblock copolymers having a central polybutadiene block and terminal polystyrene blocks, are especially preferred.

The butadiene polymer has a weight average molecular weight ($M_w$) within a range of from 1,000 to 400,000, preferably from 2,000 to 300,000, more preferably from 5,000 to 200,000 and even more preferably from 50,000 to 120,000. For purposes of this invention, molecular weights are apparent molecular weights as measured by Gel Permeation Chromatography (GPC), relative to a polystyrene standard. GPC molecular weight determinations can be performed using an Agilent 1100 series liquid chromatograph equipped with two Polymer Laboratories PLgel 5 micrometer Mixed-C columns connected in series and an Agilent G1362A refractive index detector, with tetrahydrofuran (THF) flowing at a rate of 1 mL/min and heated to a temperature of 35° C. as the eluent.

The brominating agent used in this invention is a quaternary ammonium tribromide or a quaternary phosphonium tribromide. Pyridinium tribromide, phenyltrialkylammonium tribromides, benzyltrialkylammonium tribromides and tetraalkylammonium tribromides are suitable quaternary ammonium tribromides. Specific examples include phenyltrimethylammonium tribromide, benzyltrimethylammonium tribromide, tetramethylammonium tribromide, tetraethylammonium tribromide, tetrapropylammonium tribromide, tetra-n-butylammonium tribromide and the like. Suitable quaternary phosphonium tribromides contain a quaternary phosphonium group that can be represented by the formula $R_4P^+$, where each R is a hydrocarbon group. The quaternary phosphonium tribromide may be a tetraalkylphosphonium tribromide, in which case each of the R groups is alkyl. The four R groups can all be the same. Alternatively, there may two, three or even four different R groups attached to the phosphorus atom. The R groups each are preferably alkyl having from one to 20 carbon atoms. The R groups more preferably are alkyl groups having from 1 to 8 carbon atoms. Examples of specific quaternary phosphonium tribromides include tetramethylphosphonium tribromide, tetraethylphosphonium tribromide, tetra(n-propyl)phosphonium tribromide, tetra(n-butyl)phosphonium tribromide, tetrahexylphosphonium tribromide, tetraoctylphosphonium tribromide, trihexyltetradecylphosphonium tribromide, and the like, or mixtures thereof.

The quaternary amm(phosph)onium tribromide brominating agent can be prepared by mixing the corresponding quaternary amm(phosph)onium monobromide salt with elemental bromine. The monobromide salt is usually water-soluble, so a convenient way of making the tribromide is to add elemental bromine to an aqueous solution of the monobromide salt. This reaction proceeds well at approximately room temperature, but higher or lower temperatures can be used if desired. The tribromide tends to precipitate from the aqueous phase, and so may be recovered from the liquid phase by any convenient solid-liquid separation method. Because the quaternary amm(phosph)onium tribromide is soluble in organic solvents, it can be separated from the aqueous phase by extraction with an organic solvent to form a solution of the quaternary amm(phosph)onium tribromide in the organic solvent. The tribromide is soluble in many organic solvents and may be dissolved in such a solvent if desired to facilitate the addition of the tribromide into the reaction mixture. If the organic solvent is used, it is preferably also a solvent for the starting unsaturated organic compound and most preferably is the same solvent used to dissolve the starting unsaturated organic compound. If the tribromide is prepared in the presence of water, it preferably is separated from the water before being contacted with the starting unsaturated organic compound.

The bromination reaction is performed in a solvent for the starting unsaturated organic compound. This solvent preferably is a solvent for the amm(phosph)onium tribromide brominating agent, but not a solvent for the amm(phosph)onium monobromide salt that is formed in the reaction. The process of the invention has particular value when the solvent is chlorinated, i.e., contains at least one chlorine atom. Examples of suitable chlorinated solvents include chlorinated alkanes such as carbon tetrachloride, chloroform, dichloromethane, bromochloromethane ($CH_2BrCl$) and 1,2-dichloroethane and chlorinated aromatic compounds such as bromobenzene, chlorobenzene and dichlorobenzene. The solvent preferably is a liquid under the bromination conditions and does not undesirably react with the brominating agent.

The bromination reaction is conducted by mixing the unsaturated organic compound, solvent and quaternary amm(phosph)onium tribromide together and allowing the mixture to react until the desired proportion of the sites of carbon-carbon unsaturation have been brominated. The order of addition of the unsaturated organic compound, quaternary amm(phosph)onium tribromide and solvent is not especially important, except that if the tribromide and unsaturated organic compound are mixed first, it is preferred to add the solvent before significant reaction occurs.

The solvent is used in quantities sufficient to dissolve the unsaturated organic compound under the conditions of the reaction. The concentration of the unsaturated organic compound in the solvent may range from, for example, 1 to 50% by weight, especially from 5 to 35% by weight.

About 0.5 to about 5 moles of the quaternary amm(phosph)onium tribromide are suitably used per mole of aliphatic carbon-carbon unsaturation in the starting material; a more suitable amount is from about 0.9 to about 2.5 moles/mole and an even more suitable amount is from 1 to 1.5 moles/mole.

Generally, only mild conditions are needed to effect the bromination. Bromination temperatures can range from −20 to 100° C., and are preferably from 0 to 90° C. and especially from 40 to 80° C. Temperatures higher than 100° C. could be used, but are not necessary and may lead to a loss of selectivity in some cases and/or an increase in by-products. The quaternary amm(phosph)onium tribromide becomes converted to the corresponding quaternary amm(phosph)onium monobromide salt as the reaction proceeds. The quaternary amm(phosph)onium monobromide salt is in most cases insoluble in the solvent and brominated product, and tends to precipitate out of solution, unless a second solvent is added as described immediately below.

In a preferred embodiment, a solvent for the quaternary amm(phosph)onium monobromide (referred to herein as the "second solvent") is added to the reaction mixture after the starting material has become partially brominated. The second solvent can is introduced after about 25%, preferably after about 50% and more preferably after about 60% of the aliphatic carbon-carbon double bonds in the starting material have been brominated (i.e., after at least 25%, 50% or 60% conversion). Prior to this introduction of the second solvent after partial conversion of the aliphatic carbon-carbon double bonds, the reaction mixture preferably is essentially devoid of solvent for the quaternary ammonium monobromide. The second solvent should be added no later than at the time of 90% conversion, preferably no later than about 80% conversion and even more preferably no later than 75% conversion. After the second solvent is added, the bromination reaction is continued in the presence of the second solvent, preferably to at least 90% conversion, more preferably to at least 95% conversion and even more preferably to at least 97% conversion. The reaction mixture should be agitated after adding the second solvent to provide good contact between the phases, as the second solvent is typically immiscible with the solvent for the unsaturated organic compound starting material.

If desired, the reaction can be followed analytically to monitor the conversion of the aliphatic carbon-carbon double bonds. The extent of bromination often can be determined using proton NMR methods.

The second solvent is typically a polar compound which is not reactive with the starting unsaturated organic compound, the brominated product, the quaternary amm(phosph)onium tribromide or the other solvent, under the conditions of the bromination reaction. The second solvent is preferably liquid under the conditions of the brominating reaction. The second solvent may be aprotic or protic. It may or may not be miscible with the first solvent, but most preferably is not miscible with it, so it is easier to separate and recover the second solvent (with dissolved quaternary amm(phosph)onium monobromide salt) from the first solvent and the brominated product. Water is by far the most preferred second solvent.

The bromination reaction creates a quaternary ammonium monobromide or quaternary phosphonium monobromide salt as a by-product. Applicants have found that some proportion of this by-product becomes converted to the corresponding quaternary amm(phosph)onium monochloride salt. This tends to occur frequently when a chlorinated solvent is used in the process. Therefore, the by-product of the bromination reaction is a mixture of the expected quaternary amm(phosph)onium monobromide salt and some amount of the corresponding quaternary amm(phosph)onium monochloride salt.

The quaternary amm(phosph)onium monochloride salt is contacted with a source of bromide ions to regenerate the corresponding quaternary amm(phosph)onium monobromide salt. This produces a chloride by-product, which is separated from the regenerated quaternary amm(phosph)onium monobromide salt. The monobromide salt then can be converted to the corresponding tribromide, and recycled back into the bromination reaction.

The quaternary amm(phosph)onium monochloride salt preferably is first separated from the brominated product that is formed in the bromination reaction. Because the quaternary amm(phosph)onium monochloride is often insoluble or sparingly soluble in the process solvent, it often precipitates from the reaction solution and can be removed using any convenient liquid-solid separation method, such as filtration or centrifuging. If the second solvent is used, the quaternary amm(phosph)onium monochloride salt tends to become dissolved in the second solvent. Because the second solvent typically is immiscible with the remainder of the reaction mixture, the quaternary amm(phosph)onium monochloride salt can be removed from the brominated product by removing the second solvent phase. Various washing methods also can be used.

The quaternary amm(phosph)onium monobromide salt by-product tends to be removed together with the quaternary amm(phosph)onium monochloride salt by-product. It is not necessary to separate these before performing the subsequent steps of the process.

The quaternary amm(phosph)onium monochloride salt is reacted with a source of bromide ions. The source of chloride ions may be, for example, an inorganic bromide salt such as an alkali metal bromide (including lithium, sodium, potassium or cesium bromide); an alkaline earth metal bromide salt such as calcium bromide or magnesium bromide; hydrogen bromide or a hydrobromic acid solution; an organic amine or phosphine hydrobromide salt such as triethylamine hydrobromide salt; and the like The reaction of the quaternary amm(phosph)onium monochloride salt with the source of bromide ions preferably is conducted in a suitable solvent. Although many polar organic compounds can be used as the solvent, water is highly preferred.

The quaternary amm(phosph)onium monochloride salt reacts with the source of bromide ions to regenerate the corresponding quaternary amm(phosph)onium monobromide salt and a chloride by-product. The necessary reaction conditions are generally mild. Temperatures of from 0 to 100° C., preferably 20 to 60° C. are suitable, and reaction times are commonly less than one hour. Any quaternary amm(phosph)onium monobromide that is present at the start of the reaction simply carries through and is unchanged.

The quaternary amm(phosph)onium monobromide salt that is formed in this manner is then converted to the corresponding quaternary amm(phosph)onium tribromide. This is conveniently accomplished by contacting it with elemental bromine. The quaternary amm(phosph)onium monobromide salt may be dissolved in a suitable solvent (including water). Only mild temperatures are generally required. Conditions for regenerating the quaternary amm(phosph)onium tribromide are described, for example, in WO 2008/021417 and PCT Application No. PCT/US09/53699. The quaternary amm(phosph)onium tribromide is then recycled back into the bromination reaction.

Before the quaternary amm(phosph)onium tribromide is recycled, the chloride by-product is removed. This can be done before the regenerated quaternary amm(phosph)onium monobromide is converted to the corresponding tribromide. Alternatively, this can be done after the quaternary amm(phosph)onium monobromide has been converted to the tribromide, or simultaneously with that step.

The chloride by-product can be removed from the quaternary amm(phosph)onium monobromide salt by various extraction methods, taking advantage of solubility differences between the two materials in various solvents. Acetonitrile, for example, is a good solvent for the quaternary amm(phosph)onium monobromide salt but not for many chloride by-products, and therefore it and similar materials can be used as an extractant.

The chloride by-product can be removed from the quaternary amm(phosph)onium tribromide (i.e., during or after the conversion step) using extraction methods. The quaternary amm(phosph)onium tribromide is soluble in various organic solvents in which the chloride by-product is insoluble or only sparingly soluble. Conversely, the chloride by-product tends to be highly soluble in water and some polar organic solvents in which the quaternary amm(phosph)onium tribromide salt is insoluble. These solubility differences form the basis for various extraction methods by which the needed separation can be obtained.

In a preferred process, which is suitable for continuous or semi-continuous operation, the reaction mixture obtained from the bromination reaction is extracted with an aqueous phase which may contain a reducing agent. This removes quaternary amm(phosph)onium monobromide and amm (phosph)onium monochloride salts from the organic phase and transfers them into the aqueous phase. The aqueous phase is then contacted with the process solvent and elemental bromine to regenerate the quaternary amm(phosph)onium tribromide (which migrates to the process solvent phase). The source of bromide atoms can be added to the aqueous phase, prior to or simultaneously with the regeneration step, to convert quaternary amm(phosph)onium monochloride salt to the corresponding monobromide salt. When the aqueous and organic phases are separated at the end of the regeneration step, the chloride by-product is removed with the aqueous phase.

An embodiment of the invention is illustrated in the FIGURE. The FIGURE is intended only as a schematic representation of an embodiment of the process. It includes various preferred or optional features. The FIGURE is not intended to show specific engineering features or details, including the design of the various components shown. In addition, auxiliary equipment such as various valves, pumps, heating and cooling equipment, analytical and/or control devices and the like are not shown, but of course can be used as necessary or desirable.

The process may include features in addition to those described before or shown in the FIGURE. For example, the process may include means for taking various purge streams as a way to remove accumulating impurities from the process. Fresh reagent or solvent may be added to replenish the amounts purged from the system.

In the FIGURE, the starting unsaturated organic compound is fed from holding tank V1 through line 10 to dissolution vessel V2. Dissolution vessel V2 may be omitted if the unsaturated organic compound is already dissolved in the process solvent. Line 10 may include some feeding means for transferring the starting unsaturated organic compound from vessel V1 into dissolution vessel V2, particularly if the starting compound is in the form of a solid.

In the particular embodiment shown in the FIGURE, solvent is fed into dissolution vessel V2 from line 11A, and the starting unsaturated organic compound is dissolved in the solvent in dissolution vessel V2 to form the process solution. The solvent fed from line 11A may be a recycle solvent. Alternatively, fresh solvent can be used to produce the process solution, or some combination of fresh solvent and recycled solvent can be used.

The process solution is transferred to reactor V3 through line 12. A solution of a quaternary amm(phosph)onium tribromide is introduced into reactor V3 through line 18. The unsaturated organic compound and the quaternary ammonium tribromide react in reactor V3 to produce a brominated product. At least a portion of the quaternary amm(phosph)onium tribromide is converted to a quaternary amm(phosph)onium monobromide by-product.

Reactor V3 can be either a continuous or batch reactor. Continuous reactors are generally preferred when reaction kinetics are fast because they are smaller and thus less costly. Surge vessels between unit operations are generally smaller as well. If desired, multiple reactors V3 can be used in parallel or in series, instead of the single reactor shown in the FIGURE.

In the preferred embodiment shown, water is introduced into reactor V3 via line 21 (which as shown is a recycle stream but may be fresh water), at a point such that the introduced water contacts the reaction mixture after at least 25% up to about 90% conversion of the aliphatic carbon-carbon double bonds has occurred, as described before.

The reaction that occurs in reactor V3 produces a mixture of brominated product, solvent, and quaternary amm(phosph)onium monobromide. A small amount of a quaternary amm(phosph)onium monochloride also typically forms in this step. Some residual quaternary amm(phosph)onium tribromide may be present. The mixture may contain small quantities of other materials. The brominated product will be partially or entirely dissolved in the solvent. The quaternary amm(phosph)onium monobromide salt and the quaternary amm(phosph)onium monochloride salt have little solubility in the solvent, and so tend to precipitate from the reaction mixture, unless an aqueous phase is present, in which case it may become dissolved in the aqueous phase.

The reaction mixture is transferred to first extraction column V5 (as shown, via line 13). One or more pumps or other apparatus for effecting the transfer (not shown) can be used. If reactor V3 is a batch reactor, one or more holding tanks can be interposed between reactor V3 and first extraction column V5. First extraction column V5 is most conveniently operated in a continuous manner. One or more holding tanks facilitate the transition from an upstream batch process to a continuous process starting at first extraction column V5.

The solution or slurry of the brominated product is extracted in first extraction column V5 with an aqueous phase that contains a reducing agent. In the embodiment shown, water is introduced into first extraction column V5 in two places. A solution of water and reducing agent is introduced via line 14. In addition, a second stream of water is introduced via line 15. The water stream entering through line 15 may be a recycle stream from some downstream process by which the brominated product is isolated from solution and cleaned. This arrangement allows for good control of the rate of reducing agent addition, and allows one to handle a smaller volume reducing agent stream. This arrangement also allows the reducing agent to contact the brominated product solution or slurry and reduce residual quaternary amm(phosph)onium tribromide to the monobromide salt before the solution or slurry is contacted with the bulk of the water stream. This is believed to facilitate the extraction of the quaternary amm(phosph)onium compounds into the aqueous phase and thus produce an extracted product solution with fewer ionic impurities. Alternatively, it is within the scope of the invention to introduce all of the water and reducing agent into first extraction vessel V5 in a single stream.

As shown, first extraction vessel V5 is operated countercurrently. The arrangement illustrated assumes that the solvent will be denser than the water. In such a case, the brominated product solution is introduced from line 13 near the top of first extraction column V5 and travels downward through the column. Water and the reducing agent are introduced lower in first extraction column V5, and travel upward through the column.

Quaternary amm(phosph)onium monobromide and quaternary amm(phosph)onium monochloride salts are transferred into the aqueous phase in first extraction column V5, and in that manner are removed from the solution or slurry of the brominated product. As mentioned, the reducing agent converts any residual quaternary amm(phosph)onium tribromides, which are soluble in the solvent, to the corresponding monobromide salts, which are less soluble in the solvent but more soluble in the aqueous phase. This increases the efficiency of the extraction, ensuring high recovery of the valuable quaternary amm(phosph)onium monobromide salt.

An aqueous solution containing the quaternary amm(phosph)onium monobromide and monochloride salts is withdrawn from near the top of first extraction column V5 and transferred via line 16 to mixing vessel V6. A solution of the bromide source is fed into mixing vessel V6 (as shown, through line 25) and mixed with the aqueous solution withdrawn from first extraction column V5. This converts quaternary amm(phosph)onium monochloride species to quaternary amm(phosph)onium monobromide species, forming a chloride by-product. Mixing vessel V6 can be replaced with other mixing apparatus, such as various types of in-line mixers, which can provide mechanical or static mixing.

In the embodiment shown, the resulting reaction mixture, containing water, the quaternary amm(phosph)onium monobromide salt and chloride by-product, is transferred via line 16A to second extraction column V4.

The aqueous quaternary amm(phosph)onium monobromide solution is contacted with bromine and the process solvent in second extraction column V4. In the embodiment shown, second extraction column V4 is operated countercurrently, and again assumes that the solvent is denser than water. Therefore, the quaternary amm(phosph)onium monobromide solution is introduced near the bottom of second extraction column V4. As shown, bromine is added through line 26. The bromine can be added as a solution in the solvent. Solvent is added near the top of extraction column V4, through line 11B. In the embodiment shown, solvent added via line 11B is a solvent recycle stream obtained from downstream processes for recovering the brominated product that are not shown. It is possible to add the bromine and solvent as a single stream. However, it is preferred to add the bromine separately from the bulk of the solvent, and to add the bromine below the solvent to reduce bromine losses in the aqueous raffinate. Solvent added through line 11B contacts the aqueous raffinate before that solution leaves second extraction column V4. Traces of entrained bromine in the aqueous raffinate are thus extracted into the solvent. In the embodiment shown, additional wash water is added to second extraction column V4 via line 17, below the quaternary amm(phosph)onium monobromide feed (as shown). This allows the wash water to extract traces of entrained quaternary amm(phosph)onium monobromide salt from the quaternary amm(phosph)onium tribromide solution. These separate water and solvent additions allow the monobromide, which partitions strongly into the aqueous phase, to be converted efficiently to the quaternary amm(phosph)onium tribromide species, which in turn partitions strongly to the solvent phase. The chloride by-product partitions into the aqueous phase, and so becomes separated from the quaternary amm(phosph)onium tribromide. The aqueous phase, now containing the chloride by-product, is withdrawn from second extraction column V4 via line 19, and can be cleaned up and recycled, such as into first extraction column via line 15 and/or into reactor V3 via line 21, if desired.

Therefore, a solution of the quaternary amm(phosph)onium tribromide is formed in second extraction column V4. This solution is recycled back into reactor V3 through line 18. If reactor V3 is a batch reactor, or if otherwise necessary, one or more holding tanks can be interposed within line 18 between second extraction column V4 and reactor V3. As before, holding tanks can facilitate a transition from the preferred continuous operation of second extraction column V4 and a batch operation in reactor V3.

The extractions and reactions that occur in the first extraction column V5 and second extraction column V4 can be performed in agitated batch mixing vessels if desired or necessary, but this generally requires larger more expensive equipment and intermediate storage vessels. It is preferred to perform these extractions in continuous devices, and more preferably in multistage devices. Often multistage columns or differential contactor columns are preferred for economic reasons.

A washed solution or slurry of the brominated product is formed in first extraction column V5 and removed via line 27 to downstream recovery and cleanup operations (not shown). The recovery process preferably produces a solvent stream that can be recycled into vessel V2 and/or vessel V4.

The brominated product can be recovered and cleaned up using any suitable approach. The product may become insoluble in the reaction mixture as the bromination reaction proceeds. In such a case, the product can be recovered using any convenient solid/liquid separation method such as filtration, decantation or the like. If the brominated product remains soluble in the reaction mixture, it is conveniently isolated from the mixture through a suitable method such as distillation of the solvent or addition of an anti-solvent which causes the brominated product to become insoluble and precipitate. Examples of such anti-solvents include lower alcohols such as methanol, ethanol and 1-propanol, 2-propanol, n-butanol, and t-butanol.

The isolated product may be purified to remove residual bromine, brominating agent, solvent and by-products as desired or needed for a particular application. Bromide salts may be removed by passing the product through silica gel or an ion exchange resin bed. The product may be washed with an aqueous sodium hydrogen sulfite solution to neutralize or quench unreacted brominating agent that may be present. This effectively removes or eliminates any orange color that may be present in the product due to residual bromine or bromine compounds.

One suitable recovery method is described in WO 09/006,036. That method is especially suitable for recovering a brominated organic polymer from the process solution.

The bromination process of the invention has several advantages. It allows for good reaction rates and high conversions. It permits chlorinated solvents to be used in the process, while simultaneously permitting good reaction rates, high conversions and low levels of halogen exchange (i.e., low chlorine incorporation into the brominated product). Chlorine contents in the brominated product tend to be 500 parts per million or below, especially in brominated butadiene homopolymers or copolymers produced by the process. In addition, the bromination reaction tends to be highly selective, in several respects. Little or no bromination occurs on aromatic rings that may be present in the starting unsaturated organic compound. When butadiene polymers are brominated in accordance with the invention, bromination tends to take place at the carbon-carbon double bonds of both 1,2- and 1,4-butadiene units, and bromination tends to take place so that little bromination occurs at quaternary carbon atoms. It is believed that the bromination occurs through an ionic mechanism rather than a free radical mechanism that tends to introduce unwanted bromine at allylic or quaternary carbon atoms. Bromines bonded to allylic or quaternary carbon atoms are believed to be less thermally stable than other bromine-carbon bonds and therefore their presence adversely affects the temperature stability of the brominated copolymer. Hydrobromination (the addition of HBr across a carbon-carbon double bond) has been found to be minimal using this process.

The process of the invention is capable of producing brominated butadiene polymers that have excellent thermal stability. A useful indicator of thermal stability is a 5% weight loss temperature, which is measured by thermogravimetric analysis as follows: 10 milligrams of the polymer is analyzed using a TA Instruments model Hi-Res TGA 2950 or equivalent device, with a 60 milliliters per minute (mL/min) flow of gaseous nitrogen and a heating rate of 10° C./min over a range of from room temperature (nominally 25° C.) to 600° C. The mass lost by the sample is monitored during the heating step, and the temperature at which the sample has lost 5% of it weight at 100° C. is designated the 5% weight loss temperature (5% WLT). This method provides a temperature at which a sample has undergone a cumulative weight loss of 5 wt %, based on initial sample weight. The brominated butadiene polymer preferably exhibits a 5% WLT of at least 200° C. The 5% WLT is preferably at least 220° C., more preferably at least 230° C., even more preferably at least 240° C., and still more preferably at least 250° C. Brominated butadiene polymers in which at least 85% of the butadiene units have been brominated, and which have such 5% WLT values, are of particular interest.

A further increase in thermal stability is sometimes seen if the brominated butadiene polymer is treated with an alkali metal base, as described in WO 2008/021417. The alkali metal base may be, for example, a hydroxide or a carbonate. The alkali metal base is preferably an alkali metal alkoxide, as the alkali metal alkoxides tend to provide more of an increase in thermal stability than do some other bases, such as alkali metal hydroxides, carbonates or carboxylates. The alkali metal can be lithium, sodium, potassium or cesium. Lithium, sodium and potassium are preferred. The base is an alkali metal alkoxide in preferred embodiments. The alkoxide ion can contain from 1 to 8, preferably from 1 to 4, carbon atoms, with methoxide and ethoxide being especially preferred. Especially preferred alkali metal alkoxides are lithium methoxide, sodium methoxide, potassium methoxide, lithium ethoxide, sodium ethoxide and potassium ethoxide. The brominated butadiene polymer can be treated with as little as 0.01 mole of the alkali metal base per mole of polymerized butadiene units in the copolymer (whether brominated or unbrominated). There is no upper limit on the amount of alkali metal base, although cost and handling considerations mitigate against using more than about 1 mole of the alkali metal base per mole of polymerized (brominated or unbrominated) butadiene units in the copolymer. A preferred amount is from 0.03 to 0.50 moles/mole of polymerized (brominated or unbrominated) butadiene units, and an especially preferred amount is from 0.05 to 0.20 moles/mole.

Brominated butadiene polymers made in accordance with the invention are useful as a flame retardant additive for a variety of organic polymers. Organic polymers of interest include vinyl aromatic or alkenyl aromatic polymers (including alkenyl aromatic homopolymers, alkenyl aromatic copolymers, or blends of one or more alkenyl aromatic homopolymers and/or alkenyl aromatic copolymers), as well as other organic polymers in which the brominated butadiene polymer is soluble or can be dispersed to form domains of less than 10 µm, preferably less than 5 µm, in size. Enough of the brominated butadiene polymer is preferably present in the blend to provide the blend with a bromine content within a range of from 0.1 percent by weight to 25 percent by weight, based upon blend weight.

Blends of the brominated butadiene polymer may include other additives such as other flame retardant additives, flame retardant adjuvants, thermal stabilizers, ultraviolet light stabilizers, nucleating agents, antioxidants, foaming agents, acid scavengers and coloring agents.

The following examples are provided to illustrate the invention, but not to limit the scope thereof. All parts and percentages are by weight unless otherwise indicated.

EXAMPLE 1

12 parts of potassium bromide, 16.7 parts of tetraethylammonium monochloride and 138.4 parts of water are added to a reaction flask. The flask is heated to 47° C. for 15 minutes and vacuum is then applied to remove water. A slushy white residue (34.3 parts) remains, which is combined with 81.2 parts of acetonitrile to form a slurry. The slurry is filtered and the solids are washed with 49.3 additional parts of acetonitrile. The solids are then dried under vacuum to yield 8.3 g of a mixture of potassium chloride and potassium bromide. The mixture contains 20.7% bromine and 31% chlorine. The acetonitrile filtrates are combined and the solvent is removed under vacuum to yield 20.4 g of tetraethylammonium halide salts. The mixture contains 32.5% bromine and 1.7% chlorine. These results indicate that over 90% of the starting tetraethylammonium monochloride has been converted to tetraethylammonium monobromide.

EXAMPLE 2 AND COMPARATIVE RUN A 0.5 mol of tetraethylammonium monobromide (50% in water) and 0.1 mole of solid tetraethylammonium monochloride monohydrate are mixed until the solids dissolve.

Example 1 is conducted as follows: 103 parts of the resulting solution are added to a flask equipped with a bottom drain, nitrogen inlet, addition funnel and overhead stirrer, together with 11.3 parts of potassium bromide. The mixture is stirred for one hour at about 25° C., and then left to stand overnight. 85 parts of methylene chloride are added, followed, with stirring, by 33 parts of elemental bromine, and 15 more parts of methylene chloride. A mild exotherm is seen upon the bromine addition. After stirring for 15 minutes at about 25° C., the mixture is transferred to an addition funnel, adding 22 parts of methylene chloride to aid the transfer. The organic and aqueous phases are allowed to separate in the addition funnel for use in the next step.

20 parts of a styrene-butadiene-styrene block copolymer (54% polymerized butadiene) and 206 parts of methylene chloride are added to a flask equipped with a nitrogen inlet, addition funnel and overhead stirrer. The mixture is heated to 40° C., and the organic phase from above is added over 11 minutes. The mixture is stirred for 1.5 hours while heating at 40° C. The aqueous phase from above is then added and the mixture is stirred another 1.5 hours while heating to reflux. Heating is then discontinued and 26 parts of a 10% aqueous solution of sodium bisulfate is added. The reaction mixture is transferred to a separatory funnel and the phases allowed to separate. The aqueous layer is removed, and the organic layer is washed twice with deionized water. The washed organic layer is added to 1216 parts of 2-propanol to precipitate the brominated polymer. The resulting slurry is filtered, washed with 2-propane, dried to constant weight. Yield is 48.2 parts of brominated polymer. Chlorine content is measured at 230 ppm.

Comparative Run A is run in the same way, except that the starting tetraethylammonium monobromide/tetraethylammonium monochloride monohydrate solution is not treated with potassium bromide prior to being used in the bromination reaction. This time, the chlorine content of the brominated polymer is 750 ppm, or approximately 3 times that amount seen in Example 1.

What is claimed is:
1. A process comprising
 a) contacting an unsaturated compound containing aliphatic carbon-carbon double bonds with a quaternary ammonium tribromide or a quaternary phosphonium tribromide in the presence of at least one solvent for the unsaturated compound under conditions such that the unsaturated compound becomes brominated and, as a by-product, (1) a mixture of a quaternary ammonium monobromide salt and a quaternary ammonium monochloride salt or (2) a mixture of a quaternary phosphonium monobromide salt and a quaternary phosphonium monochloride salt is formed,
 b) separating the quaternary ammonium monochloride salt or quaternary phosphonium monochloride salt from the brominated unsaturated compound, then
 c) contacting a solution of said separated quaternary ammonium or quaternary phosphonium monochloride salt with a source of bromide ions under conditions that at least a portion of the quaternary ammonium or quaternary phosphonium monochloride salt reacts with said source of bromide ions to regenerate a quaternary ammonium monobromide salt or quaternary phosphonium monobromide salt and a chloride by-product;
 d) contacting the regenerated quaternary ammonium monobromide salt or regenerated quaternary phosphonium monobromide salt with bromine to form the corresponding quaternary ammonium tribromide or quaternary phosphonium tribromide; and then
 e) before, during or after step d), separating the chloride by-product from the regenerated quaternary ammonium or quaternary phosphonium monobromide salt or quaternary ammonium or quaternary phosphonium tribromide and then
 f) recycling quaternary ammonium tribromide or quaternary phosphonium tribromide obtained in step d) back into step a).

2. The process of claim 1, wherein the solvent for the unsaturated compound is chlorinated.

3. The process of claim 1, wherein the source of bromide ions is an alkali metal bromide, an alkaline earth metal bromide; hydrogen bromide, a hydrobromic acid solution; an organic amine hydrobromide salt or an organic phosphine hydrobromide salt.

4. The process of claim 1, wherein step e) is performed before step d).

5. The process of claim 1, wherein the unsaturated compound is a homopolymer or copolymer of butadiene.

6. The process of claim 1, wherein the brominated unsaturated compound contains 500 ppm or less of chlorine.

7. The process of claim 2, wherein the source of bromide ions is an alkali metal bromide, an alkaline earth metal bromide; hydrogen bromide, a hydrobromic acid solution; an organic amine hydrobromide salt or an organic phosphine hydrobromide salt.

8. The process of claim 7, wherein step e) is performed before step d).

9. The process of claim 8, wherein the unsaturated compound is a homopolymer or copolymer of butadiene.

10. The process of claim 9, wherein the brominated unsaturated compound contains 500 ppm or less of chlorine.

\* \* \* \* \*